United States Patent
Kikuchi

[11] Patent Number: 5,933,663
[45] Date of Patent: Aug. 3, 1999

[54] CONTROL APPARATUS FOR RECORDING DATA

[75] Inventor: Hiroshi Kikuchi, Kawasaki, Japan

[73] Assignee: Canon Kabushiki Kaisha, Tokyo, Japan

[21] Appl. No.: 08/786,121

[22] Filed: Jan. 17, 1997

Related U.S. Application Data

[63] Continuation of application No. 08/281,092, Jul. 27, 1994, abandoned.

[30] Foreign Application Priority Data

Jul. 30, 1993  [JP]  Japan .................................... 5-190105

[51] Int. Cl.$^6$ .................................................. G03B 17/24
[52] U.S. Cl. ........................................... 396/315; 396/435
[58] Field of Search .................... 354/105, 106; 396/267, 310, 315, 316, 317, 318, 435; 347/246

[56] References Cited

U.S. PATENT DOCUMENTS

| | | | |
|---|---|---|---|
| 4,037,231 | 7/1977 | Broyles et al. | 346/108 |
| 4,074,294 | 2/1978 | Fujita | 354/106 |
| 4,100,556 | 7/1978 | Blinow | 354/166 |
| 4,987,434 | 1/1991 | Soshi et al. | 354/106 |
| 5,018,846 | 5/1991 | Gutridge | 350/513 |
| 5,151,586 | 9/1992 | Sato et al. | 250/205 |
| 5,274,408 | 12/1993 | Fujisawa et al. | 354/173.11 |
| 5,319,402 | 6/1994 | Tsujimoto et al. | 354/106 |
| 5,349,402 | 9/1994 | Soshi et al. | 354/106 |
| 5,600,387 | 2/1997 | Yamada et al. | 396/315 |

FOREIGN PATENT DOCUMENTS

139328  6/1988  Japan ..................................... 354/105

*Primary Examiner*—Safet Metjahic
*Assistant Examiner*—Christopher E. Mahoney
*Attorney, Agent, or Firm*—Fitzpatrick, Cella, Harper & Scinto

[57] ABSTRACT

To achieve an object to imprint optical data by an appropriate amount of imprinting light, a data recording apparatus includes a correction device for preventing the amount of light for imprinting optical data from varying as a result of an image plane size or an imprinting area being switched. The correction device includes a device for varying the amount of light emission by varying a light emission time and intensity, and an electric current used for light emission, an optical device adjusted to an appropriate transmittance in an imprinting optical path.

27 Claims, 13 Drawing Sheets

CONTROL APPARATUS FOR RECORDING DATA

This application is a continuation of application No. 08/281,092 filed Jul. 27, 1994, now abandoned.

BACKGROUND OF THE INVENTION

1. Field of the Invention

The present invention relates to the control of a data recording apparatus for recording data on an image recording medium and the like.

2. Description of the Related Art

Figure 8:
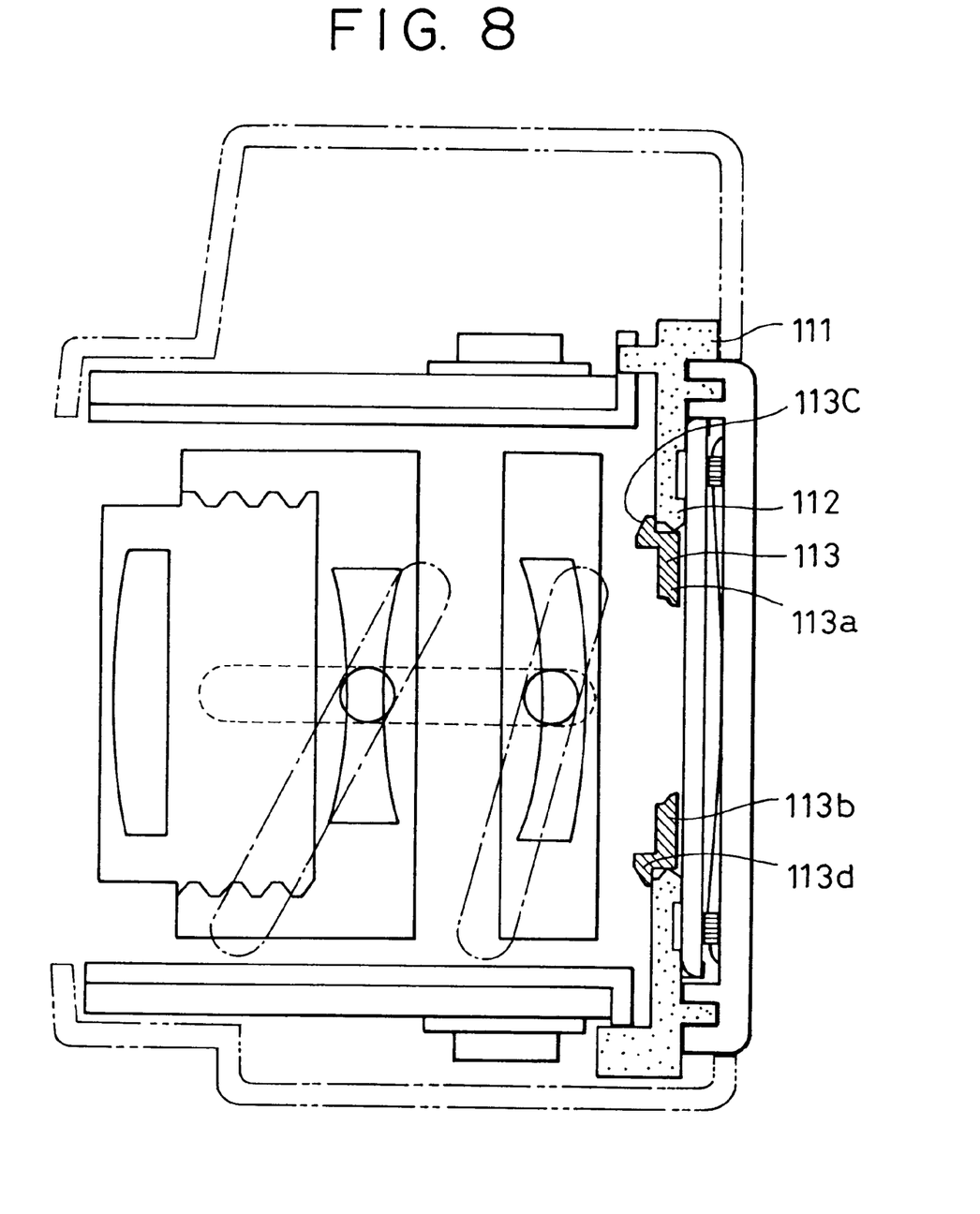
FIG. 8 is a longitudinal sectional view of a camera having mounted a conventional panoramic adaptor therein.

As one means for changing the size of a photographic image plane, a photograph of a so-called "panoramic size", i.e., 13 mm×36 mm, is generally known, which photograph is taken by an image plane frame that shields a part of the upper and lower portions of a photographing aperture of a camera body. In a camera, which takes a normal size photograph, i.e., 24 mm×36 mm, as shown in FIG. 8, a panoramic adaptor 113, constructed as an accessory of the camera, is loaded into an aperture 112 on the film side of a camera body 111 in order to take a panoramic size photograph. The panoramic adaptor 113 has light shielding portions 113a and 113b, which shield almost half of the main body aperture 112 along its vertical dimension during full size photographing, and projection portions 113c and 113d positioned and mounted in the aperture 112.

Figure 9:
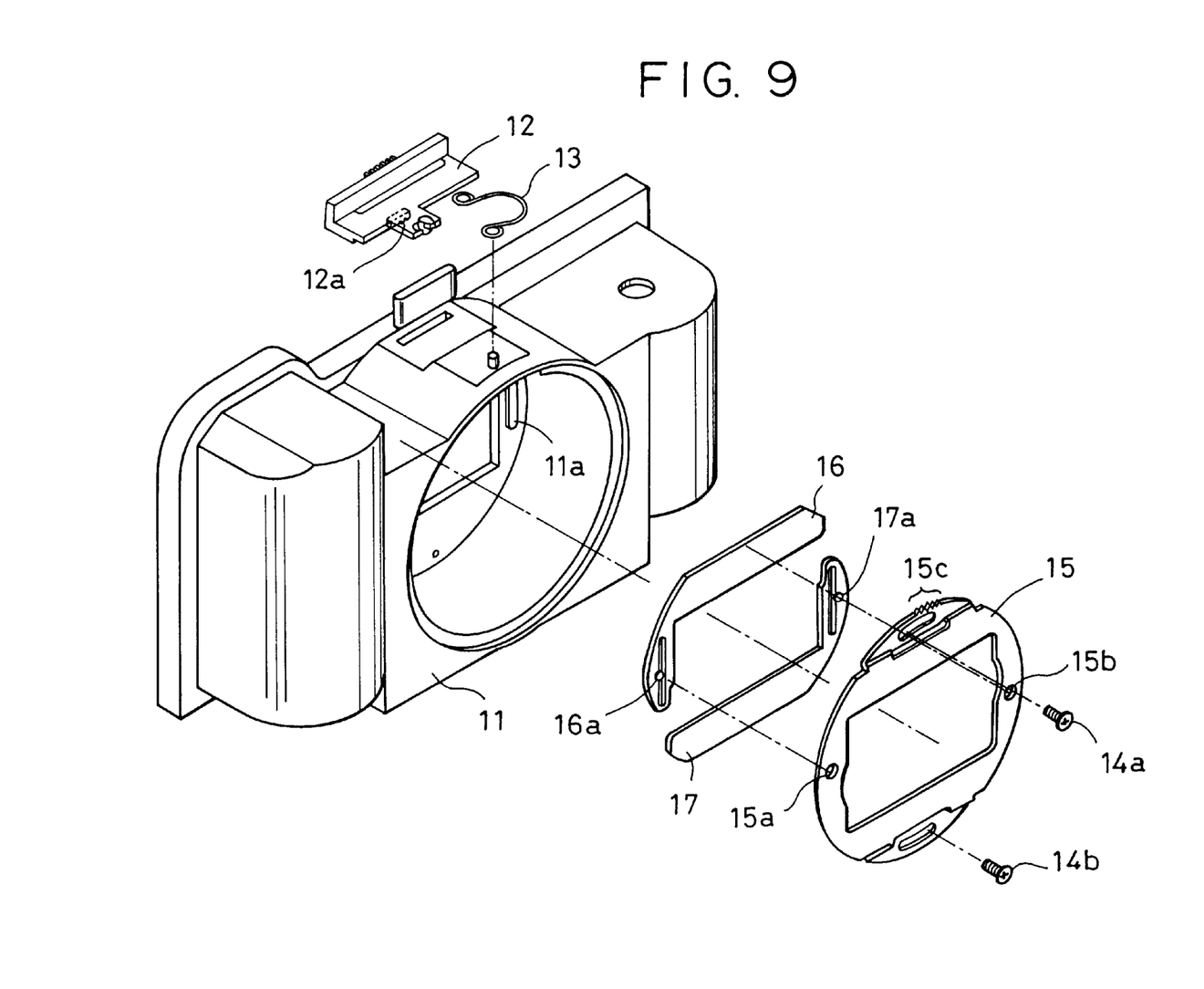
FIG. 9 is an exploded perspective view of a camera having a conventional image plane size switching mechanism.
Figure 10:
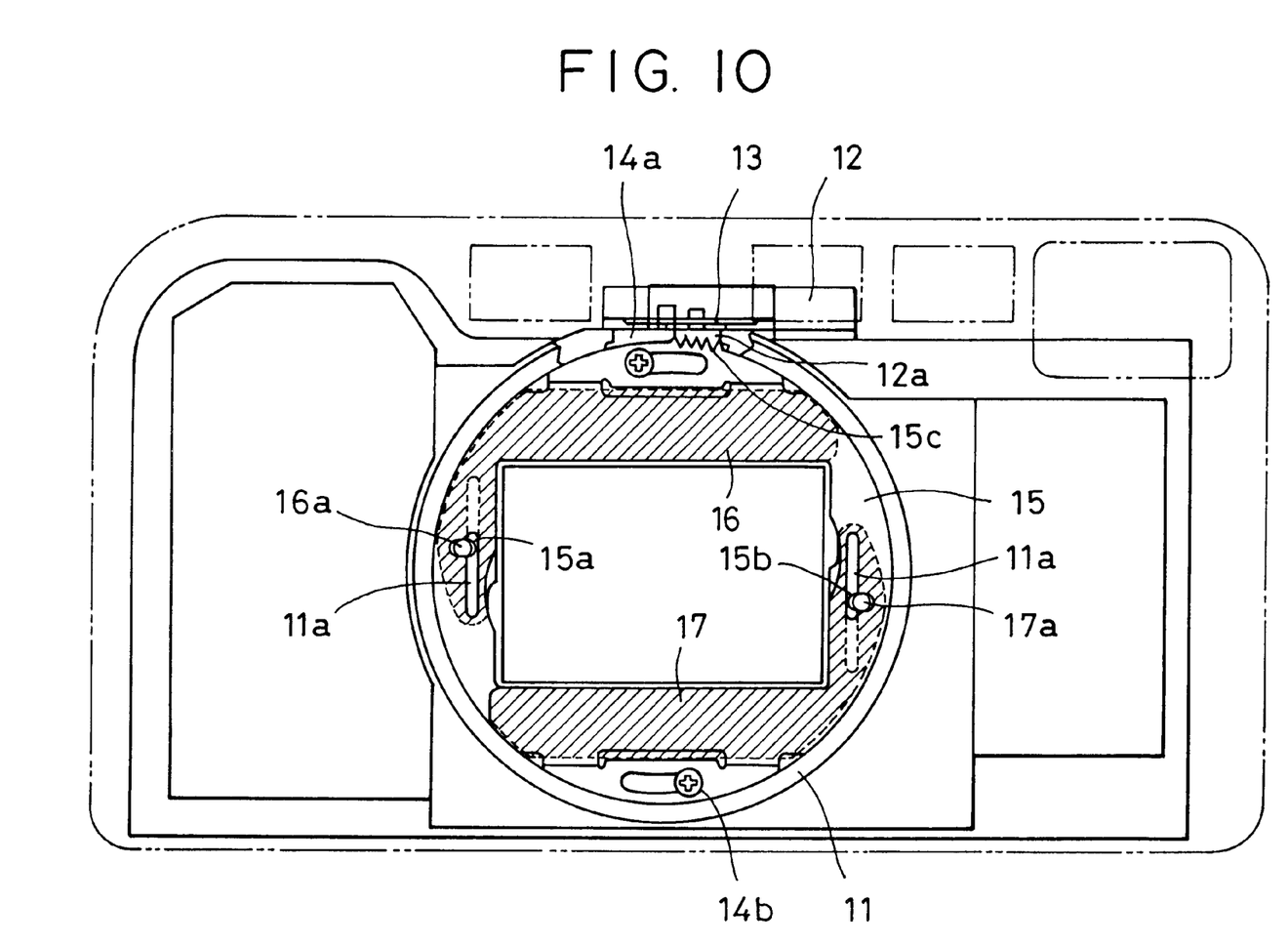
FIG. 10 is a front view of the camera shown in FIG. 9, illustrating a normal size photographing state of the camera.
Figure 11:
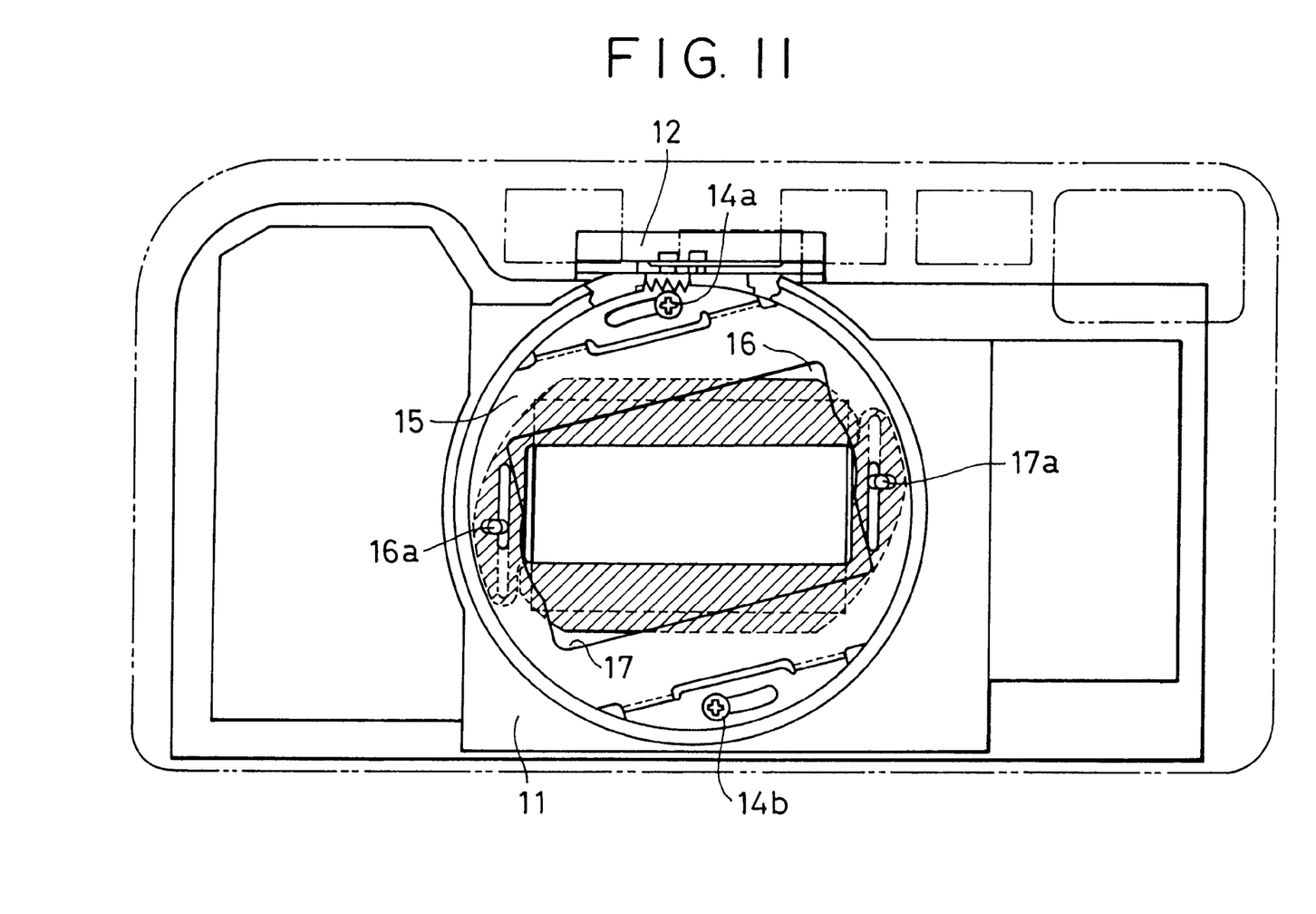
FIG. 11 is a front view of the camera shown in FIG. 9, illustrating a panoramic size photographing state of the camera.

A built-in type panoramic photographing switching mechanism of a camera shown in the exploded perspective view of FIG. 9 and front views of FIGS. 10 and 11 has been proposed. The switching mechanism comprises a control lever 12, which is slidably engageable with a camera body 11, a toggle spring 13 having an eccentric urging force from side to side along the direction in which the control lever 12 slides. A drive ring 15 is rotatably engaged with the inner circumference of the barrel portion of the camera body 11 and is securely held by screws 14a and 14b. Light-shielding plates 16 and 17 are slidably engaged with rib-shaped keys 11a of the camera body 11. Shaft portions 16a and 17a are engaged with shaft engagement holes 15a and 15b of the drive ring 15, respectively. The operation of the above-described panoramic photographing switching mechanism will be explained below. When the control lever 12 is manually operated to slide in opposition to the urging force of the toggle spring 13, the drive ring 15 is rotated via an operation portion 15c of the drive ring 15 engaging with a rack portion 12a of the control lever 12. Since the light-shielding plates 16 and 17 are able to move vertically in a direction at right angles to the optical axis along the keys 11a, the rotational movement of the drive ring 15 is a vertical movement relative to the light-shielding plates 16 and 17 as a result of the shaft portions 16a and 17a engaging with the shaft engagement holes 15a and 15b, respectively. The amount by which the light-shielding plates 16 and 17 enter the optical path is such that the photographing range on the film is 24 mm×13 mm. When the light-shielding plates 16 and 17 retract from the optical path, the aperture of the camera body determines the photographing range on the film.

Although it is possible to imprint data on a normal size image plane in a photographic image plane switching method of a camera in which a panoramic adaptor is attached, or a camera having a built-in panoramic photographing switching mechanism, most cameras do not provide the function of imprinting data in the panoramic size image plane.

Figure 12:
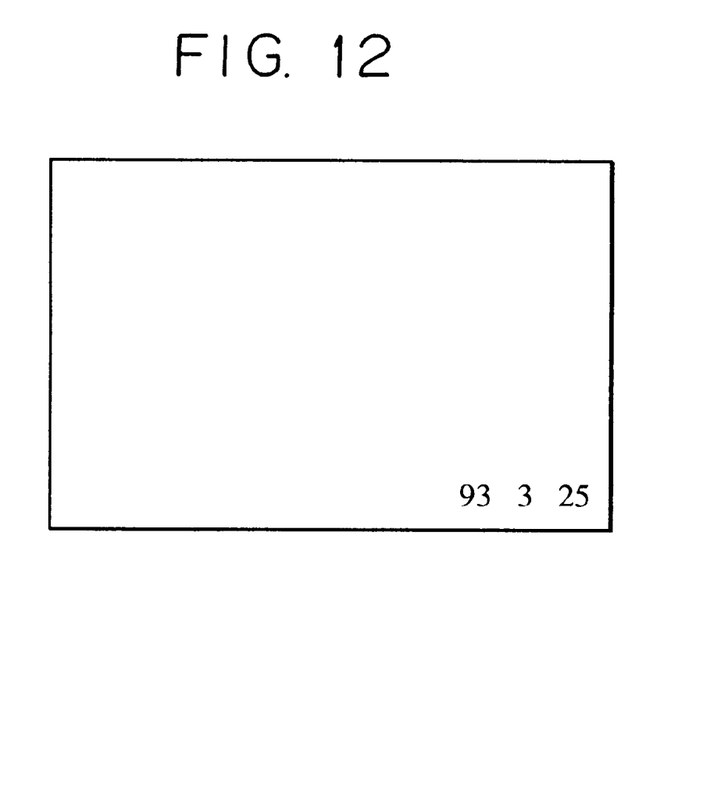
FIG. 12 is an illustration of a normal size image plane and imprinted data.
Figure 13:
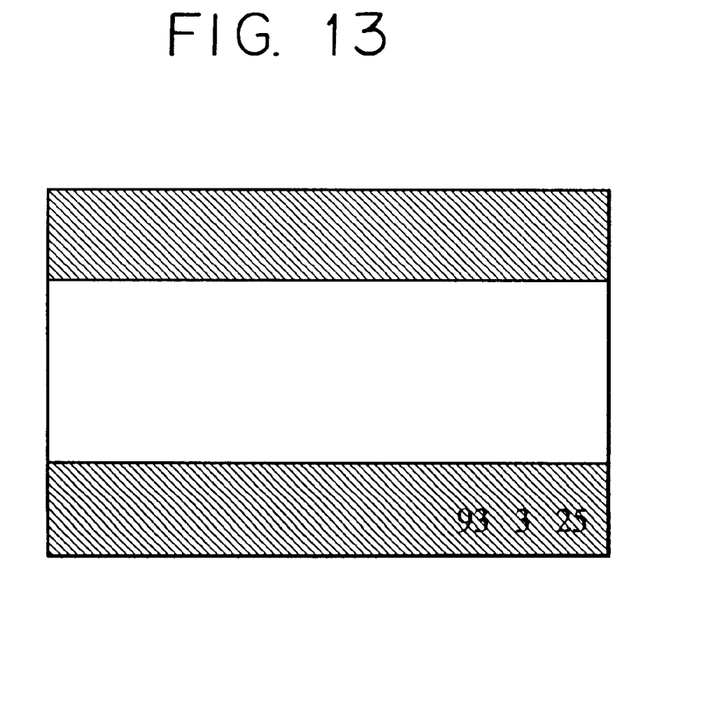
FIG. 13 is an illustration of a panoramic size image plane and imprinted data.

As shown in FIG. 12, data is imprinted in a selected area of the normal size image plane. When the upper and lower portions of the normal size image plane are shielded, as shown in FIG. 13, in connection with switching to the panoramic size image plane, the imprinted data is in a light shielded area of the normal size image plane. Accordingly, it is impossible to imprint data in the panoramic size image plane.

Therefore, an imprinting apparatus has been proposed which is capable of imprinting data also in a selected area of a panoramic size image plane. An apparatus having a plurality of imprinting elements corresponding to various sizes of image planes results in increased cost, which is problematical. In the construction in which an optical path of an optical source of one imprinting apparatus is divided and the area in which data is imprinted on the film image plane is selected so as to imprint data, the amount of light for imprinting data for a normal size image plane differs from that for a panoramic size image plane because the length of the optical path, for example, is varied, which is problematical.

SUMMARY OF THE INVENTION

According to one aspect of the present invention, there is provided a data recording apparatus having data recording means, including a common-source light emission device, for recording data in selected areas on a recording medium using light emitted from the light emission device, and light amount correcting means for preventing an amount of data recording light from varying as a result of a change in the recording area in which data is recorded by the data recording means.

According to another aspect of the present invention, there is provided a camera having the data recording means and the light emission correcting means. With this construction, it is possible to prevent the amount of data recording light from being varied as the data recording area is changed, thus solving the above-described problems.

According to another aspect of the present invention, there is provided a data recording apparatus having data recording means, including a common light emission device, for recording data in different areas of a recording medium using light emitted from the light emission device, and light emission amount control means for varying an amount of light of the light emission device as a result of a change in a data recording area in which data is recorded by the data recording means.

According to another aspect of the present invention, a camera is provided having the foregoing data recording means and light amount correcting means.

According to another aspect of the present invention, there is provided a control apparatus for a data recording apparatus capable of recording data in selected different areas on an image recording medium by using light emitted from a common source light emission device, the apparatus having means for changing a data recording area in which data is recorded; and light emission amount control means for varying an amount of light emission of the light emission device in response to a change in the data recording area in which data is recorded.

With this construction, it is possible to adjust the amount of light of the light emission portion to an appropriate amount in accordance with the change in the data recording area and to record data in correspondence with the change in the data recording position.

The above and further objects, aspects and novel features of the invention will more fully appear from the following detailed description when the same is read in connection with the accompanying drawings. It is to be expressly understood, however, that the drawings are for the purpose of illustration only and are not intended to limit the invention.

DETAILED DESCRIPTION OF THE PREFERRED EMBODIMENTS

A first embodiment of the present invention now will be explained with reference to FIGS. 1 through 5 of the drawings. In this embodiment, a description will be given of a mechanism for switching between a normal size image plane, i.e., 24 mm×36 mm, and a panoramic size image plane, i.e., 13 mm×36 mm.

In FIGS. 1 through 5, reference numeral 1 denotes a camera body; reference numeral 2 denotes an upper light-shielding plate; and reference numeral 3 denotes a lower light-shielding plate 3. Reference characters 2a and 3a denote slits. The slit 2a is vertically slidably engaged with pins 1a and 1b which are integrally disposed in the camera body 1, and the slit 3a is vertically slidably-engaged with pins 1a' and 1b', which are integrally disposed in the camera body 1. Reference numeral 4 denotes a drive ring having a U-shaped slot 4a engaging with a shaft portion 2b disposed in the upper light-shielding plate 2 and a U-shaped slot 4b engaging with a shaft portion 3b disposed in the lower light-shielding plate 3. The drive ring 4 is rotatably supported around the inner circumference of the cylindrical portion of the camera body 1. Reference numeral 5 denotes a control lever, which is slidably engaged with a projection portion 1c of the camera body 1, and is moved manually from side to side with respect to the camera body 1. An engagement portion 5a, integrally formed in the control lever 5, is engaged with a U-shaped slot 4c of the drive ring 4, and a side-to-side movement of the control lever 5 is converted into a rotational movement of the drive ring 4. Reference numeral 6 denotes a detecting switch for determining whether the camera is in a normal size photographing state or a panoramic size photographing state by detecting the rotational position of the drive ring 4. Reference numeral 7 denotes a substrate on which an LED array 7a, constituting a light source for imprinting data, is provided. The LED comprises a group of 7 LED chips arrayed in a row. Reference numeral 8 denotes an optical path barrel which forms an optical path for imprinting data. A light-shielding saw-tooth inner surface of optical path band 8 prevents reflection thereon. A mirror box 9 holds a half mirror 10 for separating the LED array 7a light into transmitted light and reflected light. The half mirror 10 is inclined 45° relative to the optical axis of the LED array 7a. A lens 11, used to imprint data during normal size photographing, is held at a position at which reflected light separated by the half mirror 10 is formed into an image on the film surface. A prism lens 12, used to imprint data during panoramic size photographing, is held at a position at which transmitted light separated by the half mirror 10 is bent by the lens prism perpendicular to the film surface and is formed into an image. The mirror box 9 holds the half mirror 10, the lens 11, and the prism lens 12 and is secured to the camera body 1. The camera body 1 is provided with holes 1d and 1e through which imprinting light is directed to a film during normal size photographing and panoramic size photographing, respectively.

Figure 2:
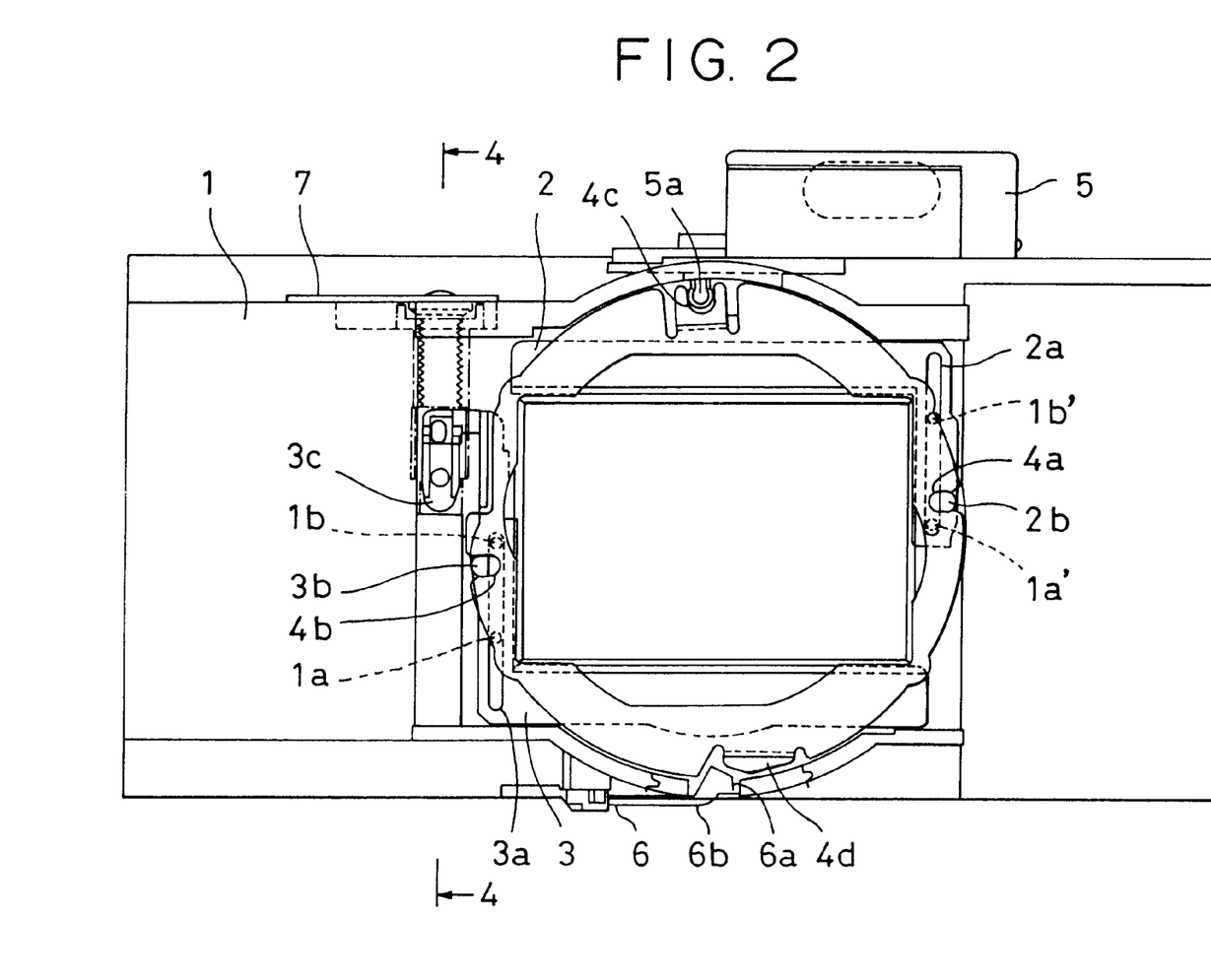
FIG. 2 is a front view illustrating a normal size state of the camera image plane size switching mechanism shown in FIG. 1.

The operation of the above-described image plane switching mechanism now will be explained. FIG. 2 illustrates a normal size photographing state, that is, a state in which the upper light-shielding plate 2 and the lower light-shielding plate 3 are retracted from the optical path of the photographic optical system, and the photographing area of the film is determined by the aperture of the camera body. To change from the normal size photographing state to the panoramic size photographing state, the control lever 5 is manually operated to slide to the right. The control lever 5 is constructed so that it can stop at a position for normal size photographing and at a position for panoramic size photographing by a click-stop mechanism (not shown). As the control lever 5 is operated, the drive ring 4 is rotated clockwise via the engagement of the engagement portion 5a with the U-shaped slot 4c of the drive ring 4. In connection with the rotation of the drive ring 4, the upper light-shielding plate 2 having the shaft portion 2b engaging with the U-shaped slot 4a is moved downwardly along a direction perpendicular to the optical axis along the pins 1a' and 1b' of the camera body 1. Similarly, the lower light-shielding plate 3 having the shaft portion 3b engaging with the U-shaped slot 4b of the drive ring 4 is moved upwardly along the direction perpendicular to the optical axis along the pins 1a and 1b of the camera body 1. Thus, the upper and lower portions of the normal size aperture are shielded, and the photographic range on the film is 13 mm measured vertically as shown in in FIG. 3. At this time, a contact portion 4d of the drive ring 4 pushes a switch contact piece 6a of detecting switch 6 to contact a switch contact piece 6b thereby closing detecting switch 6. A microcomputer (not shown) detects that a panoramic photographing state is formed.

Figure 3:
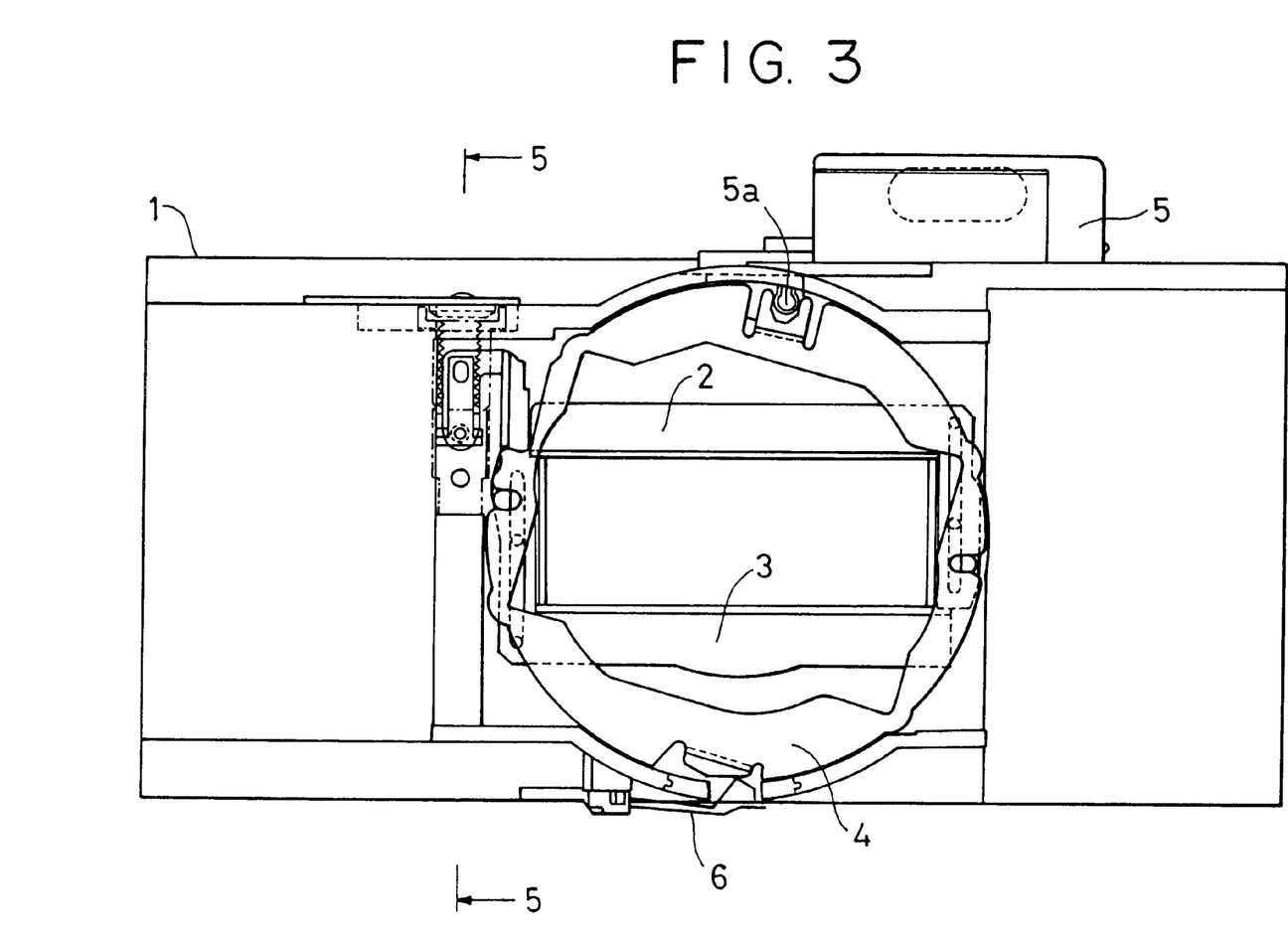
FIG. 3 is a front view illustrating a panoramic size state of the camera image plane size switching mechanism shown in FIG. 1.

In contrast to the above, when the camera is changed from the panoramic size photographing state to the normal size photographing state, the control lever 5 is manually operated to slide to the left from the state shown in FIG. 3. As the control lever 5 is operated, the drive ring 4 is rotated counterclockwise. The upper light-shielding plate 2 is moved upwardly along a direction perpendicular to the optical axis, and the lower light-shielding plate 3 is moved downwardly along a direction perpendicular to the optical axis. Thus, the plates are retracted without shielding the aperture of the camera body, and the photographic range on the film is 24 mm measured vertically as shown in FIG. 2. At this time, the switch contact piece 6a and the switch contact piece 6b are opened. The unillustrated microcomputer detects that a normal size photographing state is formed.

Figure 4:
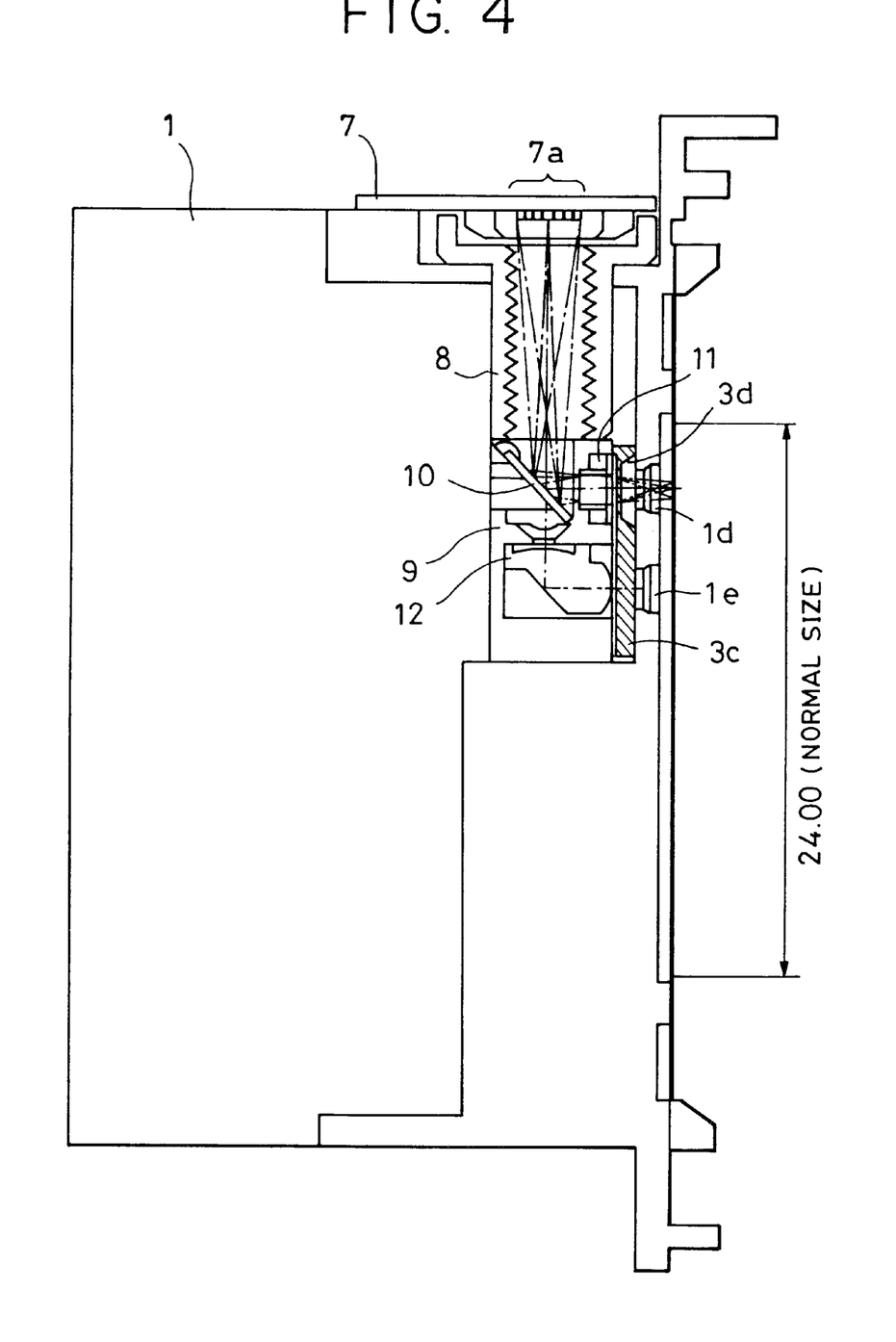
FIG. 4 is a sectional view taken along the line 4—4 of FIG. 2, illustrating an imprint optical path state during normal size photographing.

Next, a description will be given of the operation for switching a position at which data is imprinted and the operation for correcting the amount of light for imprinting data. In the normal size photographing state, as shown in FIGS. 2 and 4, an imprinting optical path shielding section 3c of the lower light-shielding plate 3 shields a panoramic size photographing state imprinting optical path hole 1e disposed in the camera body 1. A hole 3d of the lower light-shielding plate 3 is at a position flush with the normal state imprinting optical path hole 1d of the camera body 1. Light from the LED array 7a is separated by the half mirror 10, and reflected light passes through the lens 11 and is directed onto the film. The transmitted light at this time passes through the prism lens 12 and is directed to the film. However, since the panoramic size photographing state imprinting optical path hole 1e is shielded by the imprinting optical path shielding section 3c, the light does not reach the film. The data imprinting position at this time is set at a selected area with respect to the normal size image plane.

Figure 5:
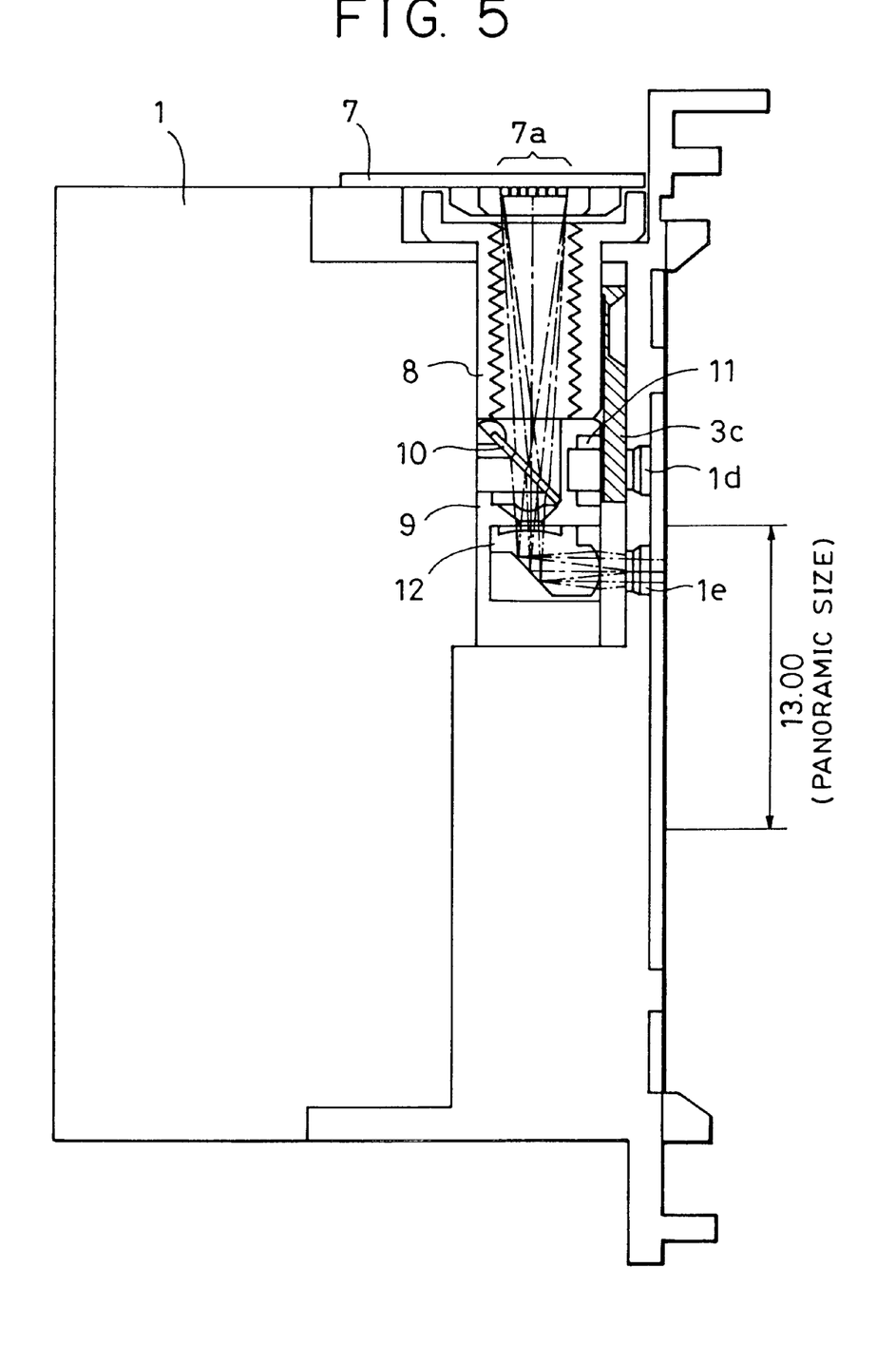
FIG. 5 is a sectional view taken along the line 5—5 of FIG. 3, illustrating an imprint optical path state during panoramic size photographing.

On the other hand, in the panoramic size photographing state, as shown in FIGS. 3 and 5, the imprinting optical path shielding section 3c of the lower light-shielding plate 3 shields the normal size photographing state imprinting optical path hole 1d disposed in the camera body 1, and opens the panoramic size photographing state imprinting optical path hole 1e of the camera body 1. Thus, light emitted from the LED array 7a is transmitted through the half mirror 10 and directed onto the film through the prism lens 12. Reflected light at this time passes through the lens 11 and is directed to the film. Because the hole 1d is shielded by the imprinting optical path shielding section 3c, the light does not reach the film. The data imprinting position at this time is set at a selected area with respect to the panoramic size image plane.

When the data imprint position is changed in connection with switching between the normal size and the panoramic size photographic image plane as described above, there is a difference between the amount of imprint light needed for the normal size and panoramic size since the imprinting optical path for the normal size is different from that for the panoramic size as shown in FIGS. 4 and 5. The amount of imprinting light for normal size is greater than that for the panoramic size photographing state. To correct for this difference, the open state of the detecting switch 6 is detected and a light emission time $t_N$ of the LED array 7a for a normal size photographing state is less than for a light emission time $t_p$ for a panoramic size photographing state ($t_N < t_p$). For a panoramic size photographing state, the closed state of the detecting switch 6 is detected, and the light emission time $t_p$ of the LED array 7a is set to be greater than $t_N$ ($t_p > t_N$). The selection of the light emission time $t_N$ or $t_p$, which is dependent on the above-described state of the detecting switch 6, is controlled by a program stored in the microcomputer.

Figure 14:
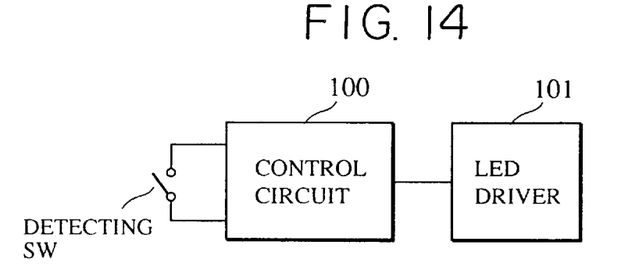
FIG. 14 is a block diagram illustrating a control circuit of a camera in accordance with the first embodiment of the present invention.
Figure 15:
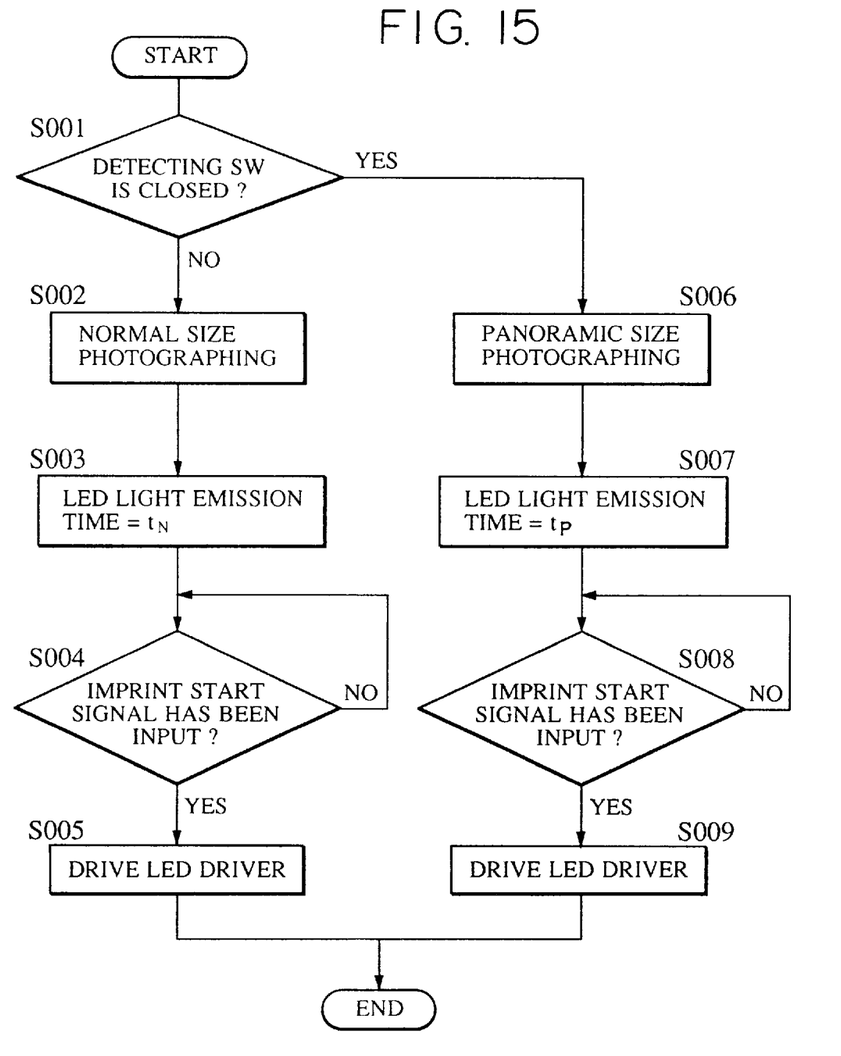
FIG. 15 is a flowchart showing the operation of the control circuit shown in FIG. 14.

FIG. 14 is a block diagram illustrating a control circuit for controlling the operation of this embodiment. FIG. 15 is a flowchart of a program stored in the microcomputer of this embodiment.

Figure 1:
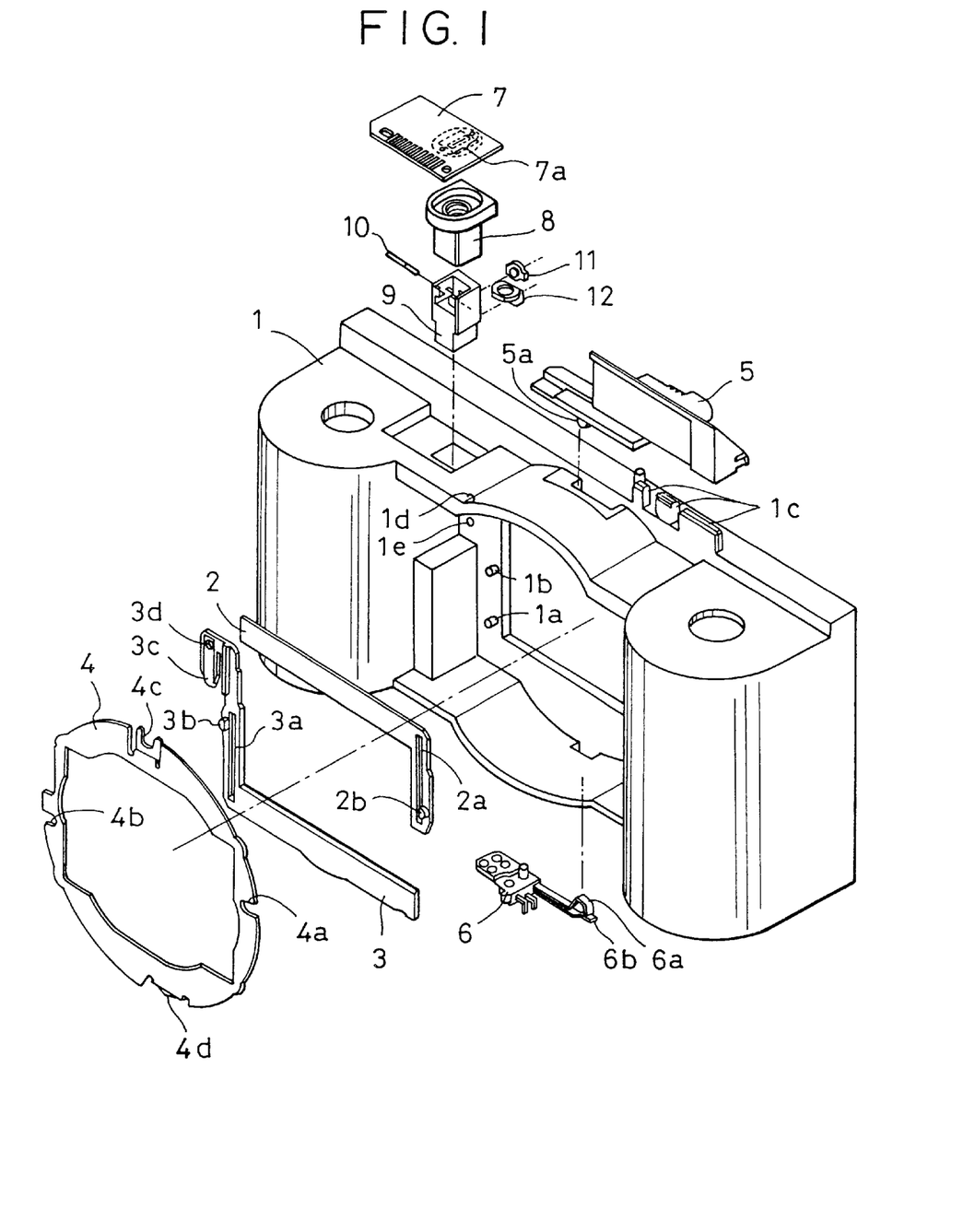
FIG. 1 is an exploded perspective view of a camera having an image plane size switching mechanism in accordance with a first embodiment of the present invention.

A detecting SW shown in FIG. 14 corresponds to the detecting switch 6 in the structural drawing in FIG. 1. The control circuit 100 detects the open/close state of the detecting SW, and the LED driver 101 is controlled by a program assembled in the control circuit 100. The operation of the control circuit of FIG. 14 will now be explained with reference to the flowchart of FIG. 15. Initially, the state of the detecting SW is detected (step 001). When the detecting SW is open, the apparatus enters the normal size photographing mode (step 002), and an LED light emission time is set at $t_N$ (step 003). When the detecting SW is closed, the apparatus enters the panoramic size photographing mode (step 006), and an LED light emission time is set at $t_p$ (step 007). When an imprint start signal is input to the control circuit in each setting (step 004 or 008), the LED driver is driven (step 005 or 009), and the LED emits light in accordance with the light emission time of the set LED. As a result, even if the same imprinting light source is used during the normal and panoramic photographing states, and there is a difference in the optical paths, it is possible to correct for a difference between the amounts of light imprinted on the film from occurring which would ordinarily occur, by varying the light emission time.

Figure 6:
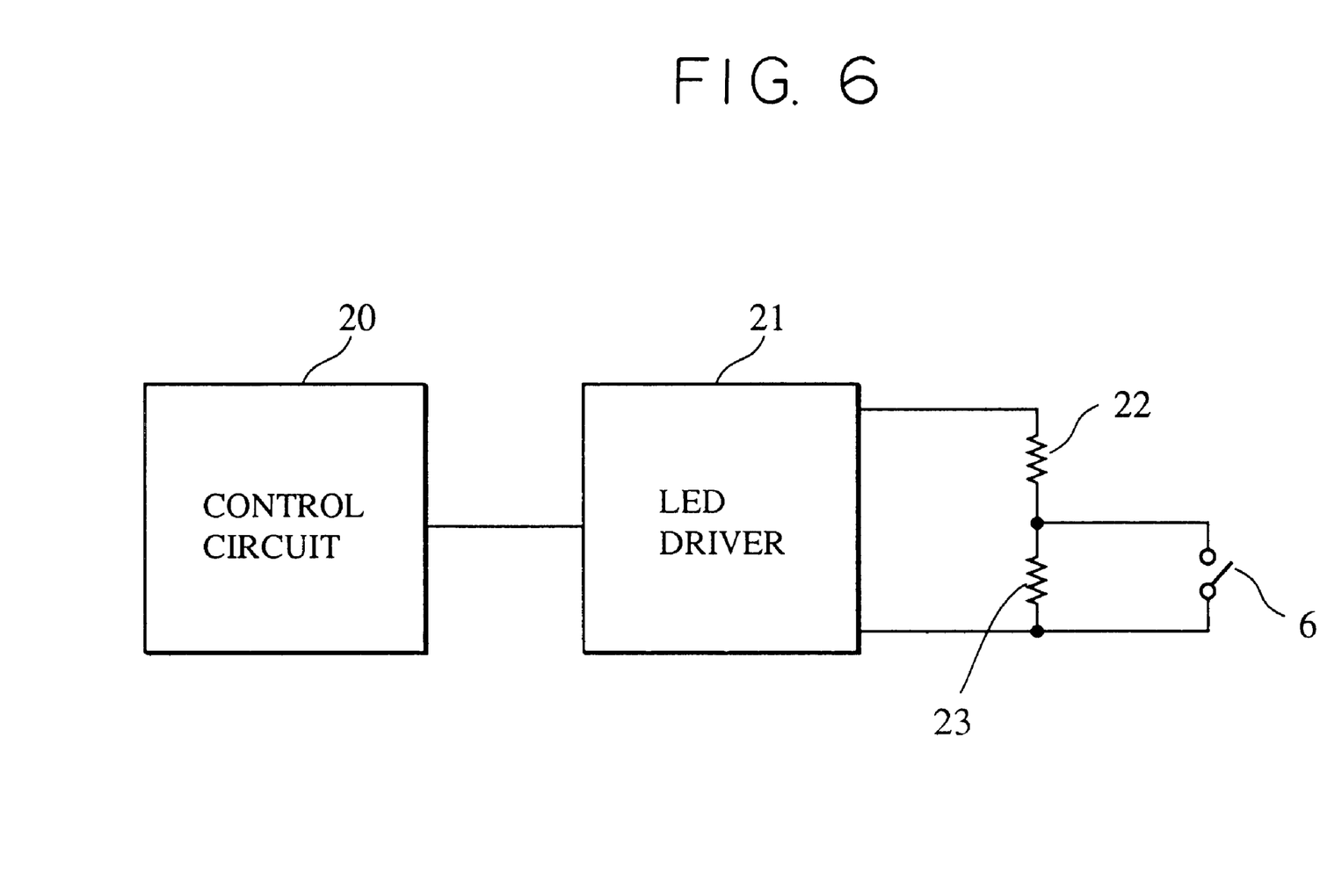
FIG. 6 is a block diagram of a camera control circuit in accordance with a second embodiment of the present invention.

In a second embodiment of the present invention, a detecting switch shown in FIG. 6 corresponds to the detecting switch 6 shown in FIG. 1. When the photographic image plane is of a normal size, since the detecting switch 6 is open, the amount of electric current $I_N$ in the circuit, including shunting resistors 22 and 23, is the amount of electric current supplied to the LED array 7a imprinting light source. When, on the other hand, the photographic image plane is of a panoramic size, since the detecting switch 6 is closed, the amount of electric current $I_P$ in the circuit, including only the resistor 22, is the the amount of electric current supplied to the LED array 7a imprinting light source. Therefore, when the amount of light for normal size photographing is different from, for example, greater than that for panoramic size photographing from a point of view of optical design, the electric current $I_P$ supplied to the LED array 7a for the panoramic size image plate can be set greater than the electric current $I_N$ supplied to the LED array 7a for normal size photographing. Therefore, it is possible to correct the imprinting light amount difference. Of course, the amounts $I_N$ and $I_P$ of electric current supplied can be set by setting the resistance value of each of the resistors 22 and 23 at an appropriate value.

In a third embodiment of the present invention, it is conceivable that the transmittance (or reflectance) of the half mirror 10 shown in FIG. 1 is set at the transmittance by which the imprinting light amount difference caused by the difference between the optical paths for normal and panoramic size image planes is corrected. However, since it is difficult to mass produce a half mirror in such a way that it has a high precision, for example, 60%±1% transmittance or reflectance. Accordingly, previously described two embodiments are more practical than this embodiment.

In a fourth embodiment of the present invention, an arrangement similar to the above-described embodiment is used when the same data imprinting apparatus is used in common for a camera capable of switching photographic size image plane, e.g., between normal and panoramic size image plane and for a camera incapable of switching the photographic image plane, i.e., useable for the normal size image plane.

Figure 7:
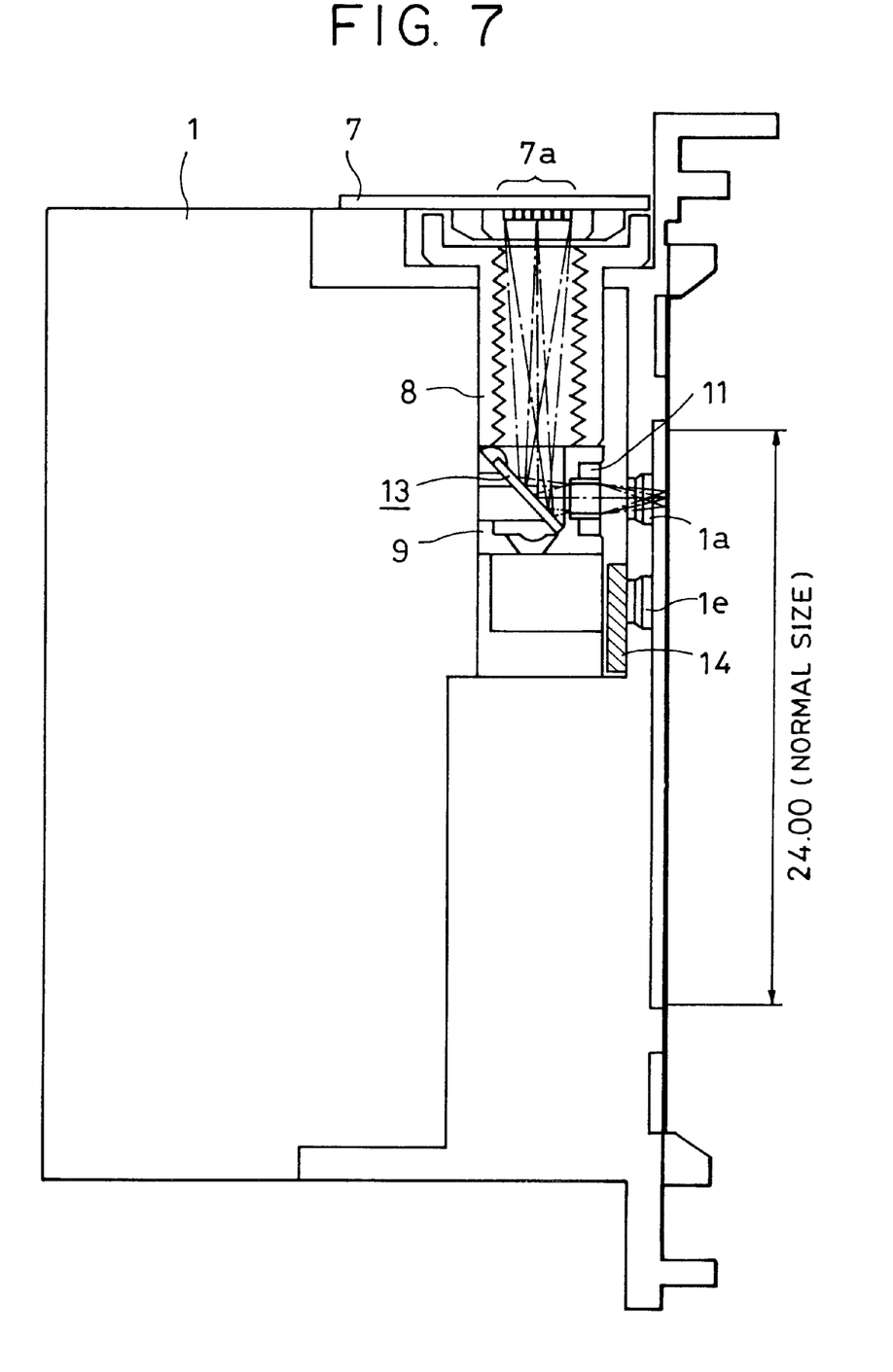
FIG. 7 is an illustration of an imprint optical path state of a camera for normal size photographing, which is incapable of switching an image plane size.

The construction of a camera capable of switching the normal and panoramic size image planes is shown in FIGS. 1 to 5. The longitudinal sectional view of a data imprinting optical path of a camera incapable of switching the photographing of an image plane, relating to the fourth embodiment, is shown in FIG. 7. In FIG. 7, the camera body 1, the LED substrate 7, the optical path barrel 8, the mirror box 9, and the imprinting lens 11 are the same as those of the camera capable of switching the two image plane sizes. Different parts of this embodiment include a total reflection mirror 13 (in place of the half mirror 10) and a light-shielding plate 14 for shielding the hole 1e of the camera body 1 through which imprinting light passes for the panoramic size. The light-shielding plate 14 is fixed to the camera body 1.

In the case of the camera capable of switching the size of an image plane, it is necessary to imprint data for each of normal size and panoramic size image planes. Light emitted from the LED array 7a is separated by using a half mirror. However, since only the normal size image plane is used in a camera incapable of switching an image plane size, the mirror may be a total reflection mirror for perpendicularly guiding light emitted from the LED array 7a onto the film surface. The total reflection mirror is advantageous because it is less costly to mass produce than a half mirror and also serve to shield light from the rear side of the mirror. However, when the amount of light emission of the LED array imprinting light source in a camera capable of switching the size of an image plane is the same as that of a camera incapable of switching the size of an image plane, the amount of light of the reflected light separated by the half mirror is approximately one half of the amount of reflected light of the total reflection mirror (when the reflectance of the half mirror is assumed to be 50%). Therefore, in the present invention, the light emission time of the imprinting LED array 7a is set at a different time so that an appropriate amount of exposure of light imprinted on the film can be obtained in both the cameras capable and incapable of switching the size of an image plane. More specifically, the microcomputer is informed of whether the camera is capable or incapable of switching an image plane size by data input to an EEPROM. In the case of a camera capable of switching the size of an image plane by a program stored in the microcomputer, a light emission time of the imprinting LED array 7a is selected as $t_1$. In the case of a camera incapable of switching the size of an image plane, a light emission time thereof is selected as $t_2$. Of course, the light emission time $t_1$ is set to be greater than $t_2$.

A description will be given of a fifth embodiment of the present invention as a modification of the fourth embodiment. In a camera capable of switching the size of an image plane, the resistance value in the circuit for supplying an electric current to the LED array imprinting light source is set at $R_1$, and set at $R_2$ for a camera incapable of switching the size of an image plane. $R_1$ is set so as to satisfy $R_1<R_2$ so that an electric current $I_1$ supplied to the LED array imprinting light source of the camera capable of switching the size of an image plane is greater than an electric current $I_2$ of the camera incapable of switching the size of an image plane.

As described above, the data imprinting apparatus of the above embodiment imprints data in a different area by the same light emission section, and performs correction so that the amount of imprinting light does not vary as a result of the imprinting position being changed. Therefore, the apparatus has the advantage that it is possible to always imprint data by a selected amount of light even when data is imprinted in a different area of the image plane. Since the data imprint area is changed in response to the switching of the size of the image plane, it is possible to always imprint data in a selected area with respect to each image plane size by an appropriate amount of light.

Although the above-described first to third embodiments describe the switching between the panoramic size photographing image plane and the normal size photographing image plane, other image plane size switchings, for example, switching between full size and half size image planes, and switching between pseudo-telegraphing size and normal size photographing plane, may be performed. The imprinting means is not limited to an LED array, or dot-type means, and any other type of imprinting means may be used.

In the above-described embodiments, the time during which the amount of imprinting light may be varied, the amount of electric current for light emission may be varied, and the transmittance and reflectance of the half mirror in the optical path may be adjusted to vary the amount of imprinting light. However, the present invention is not limited to such preferred embodiments. Other methods may be used, for example, a method in which the imprinting means is able to move in response to an imprinting position without changing the length of the optical path, or a method in which the amount of light used actually for imprinting is changed by varying the transmittance of an optical member in an optical path using other than a half mirror as a modification of the third embodiment.

As above-noted, the present invention is not limited to the construction of the above-described preferred embodiments, and any construction described in the claims and the embodiments in which the functions of the construction of the embodiments can be achieved may be used.

In addition, in the present invention, the above-described embodiments or their technological elements may be combined as required.

The individual components shown in outline or designated by blocks in the drawings are all well-known in the data recording arts and their specific construction and operation are not critical to the operation or best made for carrying out the invention.

Many different embodiments of the present invention may be constructed without departing from the spirit and scope of the present invention. It should be understood that the present invention is not limited to the specific preferred embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A data recording apparatus, comprising:
    a data recording device which records data on a data recording medium using light emitted from a light emission device through a variable light path; and
    a control device which varies an amount of the light emitted from the light emission device in accordance with a change in the light path through which light emitted from the light emission device is passed to the data recording medium, the change in the light path resulting from a change in the size of a photographic image plane of said data recording apparatus.

2. An apparatus according to claim 1,
    wherein the variable light path comprises a first light path through which light emitted from the light emission device is passed to the data recording medium, and a second light path through which light emitted from the light emission device is passed to the data recording medium, and
    wherein said control device includes means for varying the amount of light emitted from said light emission device in accordance with the light path through which the light emitted from the light emission device is passed to the data recording medium.

3. An apparatus according to claim 2, wherein the length of said second light path is different from that of said first light path.

4. An apparatus according to claim 3, wherein the length of said second light path is greater than that of said first light path, and said control device includes means for increasing the amount of light emitted from the light emission device by selecting said second light path to pass the light emitted from the light emission device to the data recording medium.

5. An apparatus according to claim 2, wherein said first light path directs light emitted from the light emission device to a first data recording position; and said second light path directs light emitted from the light emission device to a second data recording position.

6. An apparatus according to claim 1, wherein said first light path includes a first optical member and said second light path includes a second optical member which is different from said first optical member.

7. An apparatus according to claim 1, wherein said control device includes means for preventing the amount of data recording light, acting on a data recording medium on which data is recorded, from varying as a result of changing the light path through which the light emitted from the light emission device is passed.

8. An apparatus according to claim 1, wherein said data recording device includes means for recording data which is different from an image recorded on an image recording medium.

9. An apparatus according claim 8, wherein said data recording device includes means for recording data on a photographic film.

10. An apparatus according to claim 1, wherein said data recording device includes the light emission device.

11. An apparatus according to claim 2, wherein said light emission device includes a light emission element, and wherein light emitted from said light emission element is passed to said first light path and also is passed to said second light guide path.

12. An apparatus according to claim 1, wherein said control device includes means for varying an intensity of the light emitted from the light emission device.

13. An apparatus according to claim 12, wherein said control device includes means for varying an electric current actuating light emission of the light emission device.

14. An apparatus according to claim 1, wherein said control device includes means for varying a light emission time of the light emission device.

15. An apparatus adapted for use with a data recording device which records data on a data recording medium using light emitted from a light emission device through a variable light path, comprising:
    a control device which varies an amount of the light emitted from the light emission device in accordance with a change in the light path through which light emitted from the light emission device is passed to the data recording medium, the change in the light path resulting from a change in the size of a photographic image plane of said apparatus.

16. An optical apparatus usable with a data recording device for recording data on a data recording medium using light emitted from a light emission device through a variable light path, said apparatus comprising:
    a control device which varies an amount of the light emitted from the light emission device in accordance with a change in the light path through which light emitted from the light emission device is passed to a data recording medium, the change in the light path resulting from a change in the size of a photographic image plane of said apparatus.

17. A data recording apparatus usable with a first type of camera in which light emitted from a light emission device is directed along a single light path to record data other than image data at a single data recording position of an image recording material, or a second type of camera in which light emitted from a light emission device may be selectively directed along one of plural light paths to selectively record data other than image data at each of plural data recording positions of an image recording material, the data recording apparatus comprising:
    a data recording device that defines plural light paths along which light emitted from a light emission device selectively may be directed to record data other than image data at one of plural data recording positions of a data recording material, and which includes a mounting portion located along a common light path of the plural light paths on which splitting means for splitting light emitted from the light emission device may be mounted;
    a non-volatile memory, the contents of which can be rewritten, that stores information corresponding to a variable amount of light required to be emitted from the light emission device along the plural light paths of said data recording device to record data other than image data at each of the plural data recording positions of the image recording material, the information stored in said non-volatile memory also varying in accordance with the type of camera; and
    a control device that controls the light emission device to vary the amount of light emitted from the light emission device in accordance with the information stored in said non-volatile memory.

18. An apparatus according to claim 17, wherein said control device comprises means for varying a light emission time of said light emission device in accordance with information stored in the memory.

19. An apparatus according to claim 17, wherein said memory is an EEPROM.

20. An apparatus according to claim 17, wherein said memory stores information indicating characteristics of the data recording device.

21. An apparatus according to claim 20, wherein said memory comprises means for storing information indicating whether the data recording device performs a predetermined data recording operation.

22. An apparatus according to claim 21, wherein said memory comprises means for storing information indicating whether the data recording device performs data recording using light passed through a predetermined light path.

23. An apparatus according to claim 17, wherein said data recording device comprises means for recording data on a photographic film.

24. A camera usable with a data recording device that defines plural light paths along which light emitted from a light emission device selectively may be directed to record data other than image data at one of plural data recording positions of a data recording material, and which data recording device includes a mounting portion located along a common light path of the plural light paths on which splitting means for splitting light emitted from the light emission device may be mounted said camera comprising:
- a non-volatile memory, the contents of which can be rewritten, that stores information corresponding to a variable amount of light required to be emitted from the light emission device along the plural light paths of the data recording device to record data other than image data at each of the plural data recording positions; and
- a control device that controls the light emission device to vary the amount of light emitted from the light emission device in accordance with the information stored in said non-volatile memory.

25. A camera according to claim 24, wherein said camera comprises the data recording device.

26. A data recording apparatus usable with a first type of camera in which light emitted from a light emission device is directed along a single light path to record data other than image data at a single data recording position of an image recording material, or a second type of camera in which light emitted from a light emission device may be selectively directed along one of plural light paths to selectively record data other than image data at each of plural data recording positions of an image recording material, the data recording apparatus comprising:
- a data recording device that defines plural light paths along which light emitted from a light emission device selectively may be directed to record data other than image data at one of plural data recording positions of a data recording material, and which includes a mounting portion located along a common light path of the plural light paths on which splitting means for splitting light emitted from the light emission device may be mounted;
- an EEPROM that stores information corresponding to a variable amount of light required to be emitted from the light emission device along the plural light paths of said data recording device to record data other than image data at each of the plural data recording positions of the image recording material, the information stored in said EEPROM also varying in accordance with the type of camera; and
- a microcomputer having a program that controls the light emission device to vary the amount of light emitted from said emission device in accordance with the information stored in said EEPROM.

27. A camera usable with a data recording device that defines plural light paths along which light emitted from a light emission device selectively may be directed to record data other than image data at one of plural data recording positions of a data recording material, and which data recording device includes a mounting portion located along a common light path of the plural light paths on which splitting means for splitting light emitted from the light emission device may be mounted said camera comprising:
- an EEPROM that stores information corresponding to a variable amount of light required to be emitted from the light emission device along the plural light paths of the data recording device to record data other than image data at each of the plural data recording positions; and
- a microcomputer having a program for controlling the light emission device to vary the amount of light emitted from said emission device in accordance with the information stored in said EEPROM.

* * * * *